Figure 1:
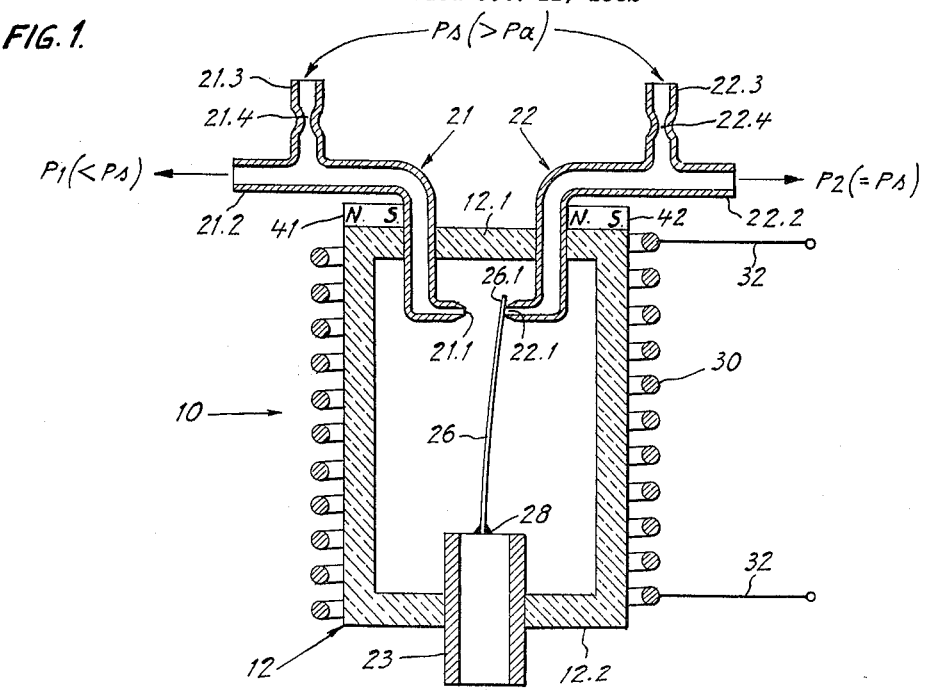

April 19, 1966    M. S. SHEBANOW    3,246,662
FLUX-ACTUATED FLUID LOGIC DEVICE
Filed Oct. 11, 1962

INVENTOR.
MICHAEL S. SHEBANOW
BY
Louis Altman
ATTORNEY

United States Patent Office 3,246,662
Patented Apr. 19, 1966

3,246,662
FLUX-ACTUATED FLUID LOGIC DEVICE
Michael S. Shebanow, Pelham Manor, N.Y., assignor to Sperry Rand Corporation, New York, N.Y., a corporation of Delaware
Filed Oct. 11, 1962, Ser. No. 229,817
1 Claim. (Cl. 137—82)

This invention relates to an electrically controlled logic device for performing fluid switching functions in data processing and/or control apparatus.

Fluid systems are widely used as the power drive in various kinds of controls. (The fluids employed in these devices may be either liquids or gases; hence the term "fluid" is used in that sense in this specification and the appended claim.) In the case of automatic control systems, an electronic computer is often used to perform the logic operations. The computer must then actuate the fluid power system in accordance with the logical decisions reached. Therefore, there is a need for relay type devices in which the electrical output of a computer is transduced into a fluid pressure change useable in the fluid power system. Accordingly, it is one object of this invention to provide a switch which yields a fluid pressure output in response to an electrical input.

Fluid switching devices are also used instead of their electrical counterparts in various types of logic-performing apparatus, such as data processing or automatic control equipment. In some situations it may be desired to employ an electrical input to control such apparatus. Therefore another object of this invention is to provide an electrically actuated device suitable for fluid switching operations in fluid logic-performing apparatus.

A further object is to provide a versatile fluid switch which is capable of a variety of logic operations.

Other objects are to provide a rugged, long-lived, reliable, fast-acting, compact, and self-contained fluid switch.

In carrying out the invention, the fluid switch employed is of the type in which the fluid flow is controlled by the positioning of a solid valve member. In particular, the valve employed is of the flapper-and-nozzle type, the operation of which is discussed in Blackburn, Reethof, and Shearer, Fluid Power Control, The Technology Press of M.I.T. and John Wiley & Sons, Inc., New York and London, 1960, particularly at pp. 243–244. Such valves are well known in the fluid control art, and in the past have been electromagnetically actuated, as for example by a solenoid and armature. But these devices have been heavy and slow for use in fast-acting fluid logic apparatus or in conjunction with ultra high speed electronic computing equipment. In accordance with this invention, the flapper-and-nozzle valve is adapted for use with flux-responsive reed-switching techniques, the result being an electrically actuated, fast-switching, long-lived, reliable, rugged, compact, and self-contained device suitable for the type of applications contemplated herein.

Figures 2, 3:
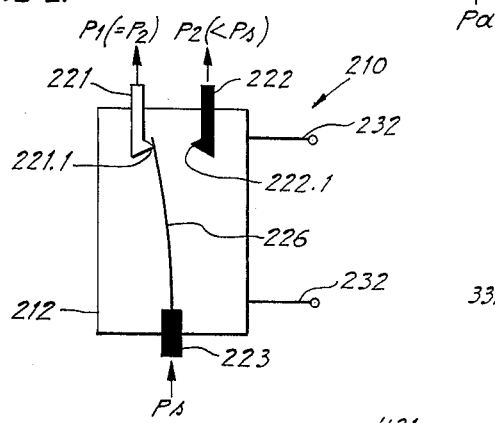
Figure 4:
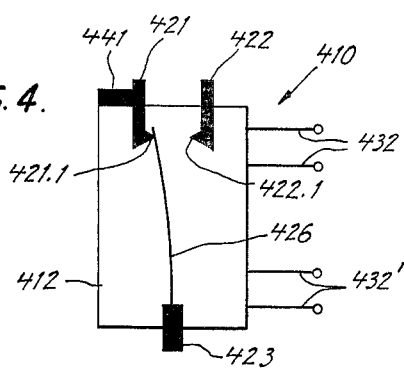

These and other features of the invention will be more fully developed in the following detailed description, including the accompanying drawings. These include:

FIG. 1, a cross-sectional view of an electrically actuated bistable fluid logic device in accordance with this invention, showing one type of external fluid circuit;

FIG. 2, a schematic representation of a fluid logic device similar to that of FIG. 1, but connected in a different way with respect to its external fluid circuit, and adapted for monostable operation;

FIG. 3, a schematic representation of a third fluid logic device similar to those of the preceding figures but designed for a different type of bistable operation; and FIG. 4, a schematic representation of a fluid logic device similar to those of the preceding figures, but designed in still another way for monostable operation.

Referring specifically to the drawings, FIG. 1 shows a cross-section of a fluid logic element generally designated 10. This includes a combined housing and support 12 in the form of a cylindrical tube closed by end walls 12.1 and 12.2. This tube is manufactured of a non-magnetic material, so as not to interfere with the magnetic forces which are employed for switching. The particular material shown in the drawing is glass, which has the advantage of permitting a view of the interior of the logic element. The end walls 12.1 and 12.2 of the tube are pierced by three conduits 21, 22, and 23 which comprise the fluid circuit of the device 10. There is a close fit between the tube end walls and these conduits, so that the tube serves as a mounting for the conduits. This type of structure has the advantage of providing a protective shell for the internal switch members, while also keeping out much of the dirt, dust, and other contaminants that tend to interfere with reliable operation. In addition, it provides a compact and self-contained switch unit.

Two of the conduits 21 and 22 are mounted upon one end wall 12.1, and terminate in respective nozzles 21.1 and 22.1 confronting each other across a small space. The third conduit 23 is mounted on the opposite end wall 12.2 of the tube, and preferably has a somewhat larger inside diameter than the two nozzle-bearing conduits so as to have a lower fluid flow resistance. A flat, elongated, flexible reed 26 has one end butt-welded at 28 to the lip of the third conduit 23 within the supporting tube 12. The reed 26 does not interfere with fluid communication through the third conduit 23. The free end 26.1 of the reed extends between the two nozzles 21.1 and 22.1 to form a flapper-type closure member. Closure is achieved when a flat side of the reed 26 seats against the orifice of one of the nozzles 21.1 or 22.1, as in the well known flapper-and-nozzle type of valve. The inherent flexibility of the reed or flapper 26 enables it to be bent toward one nozzle or the other to close either one alternatively. It will be appreciated that the flexible reed-like flapper 26 is much lighter and easier to switch than the rigid, massive, bearing-mounted flapper structures commonly employed in flapper-and-nozzle valves.

There are a number of alternative fluid configurations in which the switch of this invention can be connected. The embodiment of FIG. 1 is adaped for connection in a standard type of fluid control circuit (see FIG. 7.12, Fluid Power Control, supra, p. 196). When the flapper 26 is in the position indicated by FIG. 1, that is, attracted to the nozzle 22.1 of the second conduit, the output $P_1$ is connected directly through branch 21.2 of the first conduit and through the first nozzle 21.1 of the interior of the housing 12. In the arrangement of FIG. 1 the large third conduit 23 extending through the bottom wall 12.2 of the supporting tube is vented directly to the ambient atmosphere. This provides a direct connection to atmospheric pressure $P_a$, or pneumatic "ground." Therefore, whenever the flapper 26 is switched toward the nozzle 22.1 of the second conduit as seen in FIG. 1, the other nozzle 21.1 is opened to the atmospheric pressure level $P_a$ present in the interior of the tube 12, and consequently the output $P_1$ is connected through its associated conduit 21 to atmospheric (or ground) pressure.

Another branch 21.3 of the first conduit extends in another direction, and is crimped to form a constriction 21.4. This constriction provides high fluid flow resistance which serves to sustain a pressure differential across the resistance 21.4 in a manner analogous to the maintenance of a potential difference across an electrical resistance. On the far side of the restriction 21.4 this branch 21.3 is connected to a source of reference pressure $P_s$ which exceeds the atmospheric pressure $P_a$. This source of higher pressure $P_s$ tends to force air across the pneumatic resistance constriction 21.4, but the pressure downstream from the fluid resistance does not build up to the level $P_s$ because the flow of air is vented through the main arm of the first conduit 21 and out through the unobstructed nozzle 21.1 into the region of atmospheric pressure $P_a$ within the housing 12. Therefore the pressure output at $P_1$ is clamped at a value substantially below the supply pressure $P_s$.

The second conduit 22 is constructed in an identical manner. One of its branches 22.2 extends in a first direction and is connected to a second output $P_2$. The other branch 22.3 of this conduit extends in another direction, is formed with a constriction 22.4 to provide a high fluid flow resistance, and is also connected to a source of higher reference pressure $P_s$. In this case, however, the nozzle 22.1 of the second conduit is obstructed by the flapper 26. Therefore, the flow of air from the source of higher pressure $P_s$ causes the pressure in the second conduit 22 to rise quickly to $P_s$, and to remain there for as long as the flapper 26 continues to obstruct the nozzle 22.1. Therefore, the pressure output $P_2$ is equal to $P_s$.

Thus, in this configuration the fluid logic element can deliver a pressure output of $P_s$ at output $P_2$ and a substantially lower pressure at output $P_1$. In a typical control application, the higher pressure $P_s$ would actuate a drive of some kind, while the lower pressure $P_1$ would not do so. In a fluid computing application, one of these pressure levels might represent a binary "one," while the other would represent a binary "zero." When the flapper 26 is switched, it frees the nozzles 22.1 of the second conduit and thereafter obstructs the nozzle 21.1 of the first conduit. This has the effect of reversing the conditions; relieving the pressure in the second conduit 22 while causing a pressure build-up in the first conduit 21. As a result, there would thereafter be a pressure of $P_s$ at the output $P_1$ and a substantially lower pressure at output $P_2$.

In accordance with this invention, flux reed switching techniques are used for switching this logic device 10. A solenoid coil 30 is wound circumeferentially about the cylindrical wall of the supporting tube 12, using the latter as a coil form. Electricatl leads 32 connected to the opposite ends of the coil are illustrated schematically. These leads are brought out to a pair of terminals which may than be connected to any suitable electrical signal input. When electrically energized, the coil 30 sets up a magnetic flux which is oriented axially within the interior of the tube 12. In the embodiment of FIG. 1 each of the three conduits 21, 22, 23 and the flapper 26 are all formed of an appropriate low remanence, low coercive force ferromagnetic (i.e. very high permeability, low reluctance) material, for example, a soft iron alloy. Consequently, the third conduit 23, the flapper 26, and either the first or second conduit 21 or 22 combine to form a low reluctance magnetic flux path extending generally axially through the interior of the tube 12 and coil 30. Thus, when the coil is energized by the application of an electrical signal across its terminals 34, the resulting axial flux within the interior of the tube and coil is channeled through the conduits and flapper. As is known in the flux reed switching art, when spaced feromagnetic members conduct a flux, the magnetic forces tend to cause them to snap together so as to close the high reluctance air gap between them. Thus the flapper 26 switches to one or the other of the nozzles 21.1 or 22.1.

The device 10 is a double-throw switch; i.e. it has two alternative switching directions. Therefore polarized relay techniques are employed for choosing between these directions. Suppose the coil 30 is energized with a particular electrical polarity. For a given winding direction of the coil, this electrical polarity will determine whether the free end 26.1 of the flapper will become a magnetic north pole or south pole. In the embodiment of FIG. 1, there are secured in place against the end wall 12.1 of the tube a pair of small permanent magnets 41 and 42 (made for example of hard iron alloy or steel, with high coercive force and high retentivity characteristics), which determine the direction of switching of the flapper 26 in response to a given magnetic polarity. One of these magnets 41 is positioned with a south pole abutting against the first nozzle-bearing conduit 21. The other permanent magnet 42 is positioned with a north pole abutting against the other nozzle-bearing conduit 22. These permanent magnets are selected to be of a strength that is not sufficient in itself to attract the flapper 26 from one nozzle to another, but they do have an effect in combination with the magnetic field of the solenoid 30. If the solenoid energization polarity is such as to make the flapper tip 26.1 a south pole, then both nozzles 21.1 and 22.1 would be north poles. Then the second permanent magnet 42 will aid the flux generated by the solenoid in attracting the flapper 26 to the second nozzle 22.1. At the same time, the first permanent magnet 41 will oppose the flux generated by the solenoid and thus lessen the attraction of the flapper to the first nozzle 21.1. Thus, the flapper 26 will be switched to the second nozzle 22.1. If the solenoid energization polarity had been opposite, the flapper tip 26.1 would have been a north magnetic pole, the nozzles would both be south poles, and the differential effect of the permanent magnets would have caused the flapper to be switched toward the first nozzle 21.1. Whichever nozzle is thus selected is closed by the presence of the flapper.

When light reeds such as the flapper 26 are employed, the switching action is considerably faster than the response usually achieved by an ordinary solenoid moving a massive armature and flapper, with additional inertia often contributed by mechanical linkages. In addition there is usually some bearing friction at one or more places where the armature and flapper are supported. Here, in contrast, movement of the flapper 26 results from its inherent flexibility. Thus no bearings are required, and no bearing friction is introduced. The result is high switching speed, low wear, long operating life, and high reliability.

Now let us assume that the flapper 26 has been switched to the second nozzle 22.1 as illustrated in FIG. 1. Its associated permanent magnet 42, although not strong enough to have switched the flapper to the second nozzle without the aid of the solenoid 30, does supply sufficient flux to hold the flapper in position once it has been switched, even though no further energization is applied to the solenoid 30. The flapper 26 therefore remains stably attracted to the second nozzle 22.1 so that the logical condition set up by last signal input is retained. The opposite switching position would likewise be retained by the other permanent magnet 41 after a signal input of appropriate polarity to switch the flapper 26 to the first nozzle 21.1. Thus the permanent magnet 41 and 42 perform a double function. They not only aid in switching, but act as holding magnets as well. As a result the device 10 of FIG. 1 represents a bistable switch or flip-flop with memory characteristics. Switching can be accomplished in either direction by a brief solenoid pulse of appropriate polarity. The state so selected is then stable until a brief solenoid pulse of opposite polarity switches the device 10 into its other stable state.

The switching of this device is enhanced by the relationship between the fluid pressures and the magnetic forces affecting the flapper 26. With the flapper abutting one of the nozzles 21.1 or 22.1, the fluid pressure which is contained by the flapper exerts a force tending to push the flapper away from the nozzle. But the closer the flapper is to the nozzle, the smaller is the high reluctance air gap between them, and therefore the stronger is the magnetic attraction which switches and then holds the flapper. At a slight distance from the nozzle the magnetic force attracting the flapper falls off rapidly. But at the same time the fluid pressure effect on the flapper is believed to change from repulsion to attraction, possibly because of Bernoulli pressure reductions caused by the resulting small fluid leakage currents in the space between the nozzle tip and the flapper surface. As a result, during switching the pull-in of the flapper is at first aided by pressure effects, after which the magnetic forces achieve their maximum switching capability. After switching has been accomplished, the holding action of the magnetic forces is aided by the pressure effects if the flapper has any tendency to pull away. If the suggested explanation of these pressure effects is correct, nevertheless it has been observed that the leakage losses are not large, and the described structure is capable of effective nozzle-sealing without undue leakage over a wide range of pressures, including the range in which fluid control or computation would normally take place. In particular, if a flat-faced type of nozzle (see FIG. 9.8(b), Fluid Power Control, supra, p. 244) is used, the fluid pressure flapper attraction phenomenon seems to be greatly enhanced and to increase with increasing pressure. Therefore the device of this invention is believed to have very high pressure capabilities.

It has been stated that in the embodiment of FIG. 1 the interior of the tubular housing 12 is vented to the atmosphere. Therefore it is not necessary that the housing be sealed. In fact, although the structure of FIG. 1 is preferred, all or any part of the housing 12 could be dispensed with and alternative means provided for supporting the first and second conduits 21 and 22, the flapper 26, the coil 30, and the holding magnets 41 and 42. The third conduit 23 is also not essential in this embodiment, for the reason just stated. Its presence is preferable because it cooperates with the flapper 26 in establishing an axial flux path, but a device employing the same switching principle could be operated with only the flapper 26 and one of the first two conduits 21 or 22 to conduct the flux.

In FIG. 2 there is illustrated another embodiment of this invention. In place of the detailed representational showing provided by the cross-sectional view of FIG. 1, FIG. 2 employs a schematic symbol of another logic element 210. This device is identical to the switch 10 of FIG. 1 except for certain differences discussed below. In the schematic symbol of FIG. 2 the various elements resemble their actual counterparts in appearance (as seen by comparison with FIG. 1), and can be readily correlated therewith by means of the related reference characters applied thereto. Note particularly that the second and third conduits 222 and 223 of FIG. 2 are shown in full solid. This form of representation is intended to indicate that these members are composed of a ferromagnetic material. In contrast, the first conduit 221 of FIG. 2 is shown in outline representation to symbolize the fact that it is made of a non-ferromagnetic material.

The embodiment of FIG. 2 is a monostable fluid switch employing the principles of this invention. As indicated in the drawing, the first conduit 221 is similar to the conduits 21 and 22 of the preceding embodiment except that it is formed of a non-ferromagnetic material. Therefore it does not form a low reluctance flux path, and consequently does not serve to attract the flapper 226 when an axial magnetic field is created in the interior of the logic device 210. Therefore magnetic forces are not used to attract the flapper 226 to the first nozzle 221.1. Instead, the flapper 226 is made of an inherently resilient spring material, and is set so that in its normal position it is curved toward the first nozzle 221.1 as shown in FIG. 2. Furthermore, the spring strength of the flapper 226 is made great enough to keep it in that position at all times except when switching forces are currently exerted thereon. Thus the flapper 226 normally closes the first nozzle 221.1, this being the one stable state of the switch 210.

Magnetic forces are used to switch the flapper 226 to the second nozzle 222.1, in the manner described above. Accordingly, the flapper 226 and the second and third conduits 222 and 223 are made of a ferromagnetic material (as indicated in FIG. 2), preferably having low coercivity, low retentivity characteristics. Therefore when the coil of the device 210 is energized, the resulting axial flux is channeled through these members and exerts a force, which is made strong enough to overcome the inherent spring bias of the flapper 226, to attract the flapper to the second nozzle 222.1. Permanent magnets are not needed to determine the switching direction in this embodiment. The second conduit 222 is magnetic, while the first one 221 is not. Therefore the second conduit presents the only available route for the flux, and the flapper 226 can only be attracted there, regardless of the polarities involved. The switch to the second conduit 222 is only temporary, however, the spring force regaining control and returning the flapper 226 to the first conduit 221 (the position illustrated) as soon as the switching pulse terminates. Therefore the second conduit represents the unstable or momentary switching state of the device. Nor are permanent magnets required for holding purposes in this embodiment. The second conduit 222 does not represent a stable state, while the spring force performs the holding function at the first conduit 221. Alternative methods of biasing can be employed with similar effect, as will appear below.

FIG. 2 demonstrates an alternative fluid circuit which is also useful with this invention. For use in this circuit, the fit between the supporting tube 212 and the conduits 221, 222, and 223 should be a sealing fit, so that the tube constitutes a closed chamber in which a desired pressure level can be maintained, subject to change only through the conduits. Here the source of high reference pressure $P_s$ is connected to the third conduit 223, so that the sealed interior of the housing 212 is maintained at that pressure level. Then this reference level is communicated through the open nozzle 222.1 into the second conduit. The conduits 221 and 222 each have but one outlet in this embodiment. The outlet of the second conduit 222 is connected to the output $P_2$ so that the pressure $P_s$ is communicated to that output. The first conduit 221 outlet is connected to the other output $P_1$. However, since the flapper 226 is switched to block the first nozzle, the high reference pressure level $P_s$ within the supporting tube 212 is not communicated to that output. Thus the pressure communicated to the output $P_2$ is substantially less than the reference level $P_s$. When the flapper 226 is momentarily switched to the second conduit 222, the reverse situation exists; the output to $P_2$ would be substantially less than $P_s$, while the output to $P_1$ would equal $P_s$. Upon termination of the switching pulse, the flapper 226 would spring back to the nozzle 221.1 of the first conduit, and the condition illustrated in FIG. 2 would again occur. The pneumatic configurations of FIGS. 1 and 2 can each be used with any embodiment of the invention.

FIG. 3 shows a similar schematic symbol representing another fluid logic device 310 in accordance with this invention. This embodiment is similar to that of FIG. 1, and is also a bistable device. There are permanent magnets 341 and 342 for direction-determining and holding purposes at the first and second conduits 321 and 322. In this embodiment there are two separate coils wound about the tubular housing, as indicated in the schematic symbol by the two separate pairs of electrical leads 332 and 332′. These coils are so wound and connected that a switching pulse on one of the coils is effective to attract the flapper 326 toward the first conduit 321, while a switching pulse input to the other coil is effective to switch the flapper to the second conduit 322. This is indicated in the schematic symbol by the fact that the two pairs of leads 322 and 332′ extend in opposing directions from the tubular housing 312. Therefore the switching direction is determined by selecting which one of the two coils will receive the input pulse.

In connection with the embodiments of FIGS. 1 and 3, it should be noted that if the memory feature is removed, as by weakening the holding magnets, then these devices would no longer be bistable but would still be double-throw switches, having a momentary-on, momentary-off type of operation.

In the monostable embodiment illustrated by the schematic symbol of FIG. 4 once against the flapper 426 and all the conduits 421, 422, and 423 are formed of ferromagnetic material. There are again two coils wound about the tubular housing 412, but in this case the schematic representations of the pairs of leads 432 and 432' for the respective coils both extend in the same direction, indicating that the coils are wound and connected in such a manner that both tend to attract the flapper 426 in the same direction; toward the second conduit 422. In order to switch the flapper 426 in that direction a magnetic flux of sufficient strength must be established in the interior of the tubular housing 421, which is accomplished by energization of one or more of the solenoids wound about the housing. Suppose the number of turns in each coil and the amount of current used to energize the coils is so selected that neither coil can switch the flapper 426 by itself, but both coils energized simultaneously can do so. Then the switch 410 of FIG. 4 becomes an "and" or "coincidence" gate; a device which produces a selected output only in response to the simultaneous application of two selected inputs; to leads 432 *and* 432'. On the other hand, if the coils and the energizing current are arranged so that either coil alone is capable of switching the flapper, then the switch 410 is an "inclusive or" gate; a device which produces a selected output in response to the application of one or the other or both of two selected inputs; leads 432, *or* leads 432', *or* leads 432 and 432'.

The device 410 of FIG. 4 is made to operate in a monostable manner like that of FIG. 2. Once again the coils are used only for switching the flapper 426 momentarily. But here magnetic biasing is employed instead of spring biasing to return the flapper to its normal position. No holding magnet is associated with the second conduit 422. In addition the magnetic material of the second conduit has a low remanence characteristic. Thus there is no high retentivity material present at that side of the logic device 410 to hold the flapper 426 against the second nozzle 422.1 after solenoid energization is terminated. The first conduit 421, in contrast, has a permanent magnet 441 associated therewith. The latter is chosen to have sufficient strength to attract the flapper 426 to its illustrated position adjacent the first nozzle 421.1 whenever it is not currently being held against the second nozzle 422.1 by a switching input. Any alternative method of biasing, such as the spring-biasing method of FIG. 2, can be used to achieve the same effect. In any case, the illustrated position is the one stable state of the device. Switching to the other state is momentary, rather than stable, and terminates when the switching input terminates. Thus, the device 410 of FIG. 4 is a momentary switch capable of performing the "and" or the "inclusive or" function.

Those skilled in the art will now readily see that there are several other ways to achieve the same use of magnetic flux, in all the various embodiments of this invention, for switching and holding purposes according to the principles taught herein. For example, separate permanent magnets would not be necessary if the conduits themselves or some part thereof were made of a high coercivity, high retentivity (i.e. a hard or permanent magnet) material. In a bistable device there would be a north pole at one nozzle and a south pole at the other. Alternatively, if the conduits or some part thereof were formed of a low coercivity (i.e. soft) but high remanence material such that the conduits retained enough residual flux for holding purposes, then the permanent magnets would not need to be strong enough to serve as holding magnets. They would only need enough strength to perform the direction-determining function.

As another alternative, instead of two distinct permanent magnets a single bar or horseshoe magnet might be mounted with opposite poles adjacent the two respective nozzle-bearing conduits.

The direction-determining function might also be performed by individual auxiliary coils of electrical wire wound about the respective conduits to provide the direction-determining flux. In that case the coils would be pulsed in synchronism with the main solenoid, and the magnetic polarities which the coils induce in the respective conduits would be opposite. If the flux generated were of sufficient strength, it would only be necessary to energize one of the auxiliary coils, for example, the one wound about the conduit to which the flapper is to be switched. Carrying this idea further, only one auxiliary coil might be used, wound about only one of the nozzle-bearing conduits, and the switching direction could then be altered by changing the energization polarity of that one auxiliary coil. One polarity would aid the attraction of the associated conduit, while the opposite polarity would oppose it, thus determining which conduit succeeds in attracting the flapper. An easy way to achieve pulse synchronism would be to connect the auxiliary coil or coils to the same energization circuit as the main solenoid. In that event, if two such coils are employed they could either be wound in opposite directions on the respective conduits or else connected to opposite voltages in the main coil circuit to achieve opposite magnetic polarities.

Another possibility would be the use of such auxiliary coils on the conduits to perform the holding function. For this purpose they would have to be kept energized during the memory interval. An advantage of this approach would be that, in a situation where the pressure-containing capabilities of the flapper are dependent upon the application of larger magnetic holding forces, coils might be better able than permanent magnets to provide such forces and thus to extend the pressure range of the device.

It will now be appreciated that there have been disclosed several useful illustrative embodiments of a fluid switch having utility as a logic device in a variety of fluid circuits performing control or computation functions, and particularly meeting the need for a transducer or relay to link electronic computing systems with fluid power systems in control applications. The device furthermore has the advantages of fast switching response, low wear, durability, long operating life, and high reliability, and is a compact and self-contained unit.

What has been described is a preferred embodiment and is believed to be the best mode of practicing the invention, but it will be clear to those skilled in the art that modifications may be made therein without departing from the principles of the invention. Accordingly this description is intended just as an example, the scope of the invention being stated in the appended claim.

I claim:

A fluid logic device comprising:
(a) a hollow supporting tube including opposite end walls and arranged to enclose an interior chamber;
(b) a first pair of fluid conduits making a sealing fit with one end wall of the tube and including respective nozzles positioned within the interior of the tube;
(c) a third conduit making a sealing fit with the opposite end wall of the tube and communicating with the interior chamber;
(d) a flexible flapper, of which one end is secured to the third conduit, and the other end freely projects generally axially within the interior of the tube;

(e) and at least one electrical coil wound circumferentially about the tube;
(f) the flapper, the third conduit, and at least a selected one of the first pair of conduits being at least partly fabricated by ferromagnetic material and cooperating to form a generally axial flux path to attract the flapper free end to the nozzle of the selected conduit;
(g) means for biasing the flapper end to the nozzle of the other of said first pair of conduits;
(h) a first output means connected to a first one of the nozzle-bearing conduits through a relatively low fluid resistance;
(i) a source of input pressure connected to the first nozzle-bearing conduit through a relatively high fluid resistance;
(j) a second output means connected to a second one of nozzle-bearing conduits through a relatively low fluid resistance;
(k) a source of input pressure connected to the second nozzle-bearing conduit through a relatively high fluid resistance;
(l) the interior of the tube being vented to ambient pressure through the third conduit.

References Cited by the Examiner

UNITED STATES PATENTS

| | | | |
|---|---|---|---|
| 2,609,464 | 9/1952 | Brown et al. | 200—93.4 X |
| 2,907,846 | 10/1959 | Withelm | 200—87 |
| 3,012,575 | 12/1961 | Woody et al. | 137—625.62 |
| 3,026,390 | 3/1962 | Koda | 200—93.4 X |

FOREIGN PATENTS

| | | |
|---|---|---|
| 728,534 | 4/1955 | Great Britain. |
| 730,965 | 6/1955 | Great Britain. |

ISADOR WEIL, *Primary Examiner.*

LAVERNE D. GEIGER, WILLIAM F. O'DEA,
*Examiners.*

E. REICHERT, A. COHAN, *Assistant Examiners.*